(12) United States Patent
Jidhage et al.

(10) Patent No.: US 11,101,861 B2
(45) Date of Patent: Aug. 24, 2021

(54) WIRELESS COMMUNICATION SYSTEM NODE WITH FIXED BEAMS HAVING COMMON ENVELOPE

(71) Applicant: Telefonaktiebolaget LM Ericsson (publ), Stockholm (SE)

(72) Inventors: Henrik Jidhage, Hovås (SE); Martin Johansson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 16/608,244

(22) PCT Filed: May 31, 2017

(86) PCT No.: PCT/EP2017/063099
§ 371 (c)(1),
(2) Date: Oct. 25, 2019

(87) PCT Pub. No.: WO2018/219439
PCT Pub. Date: Dec. 6, 2018

(65) Prior Publication Data
US 2020/0186217 A1     Jun. 11, 2020

(51) Int. Cl.
*H04B 7/06*     (2006.01)
*H04W 16/28*     (2009.01)

(52) U.S. Cl.
CPC .......... *H04B 7/0617* (2013.01); *H04W 16/28* (2013.01)

(58) Field of Classification Search
CPC ...... H04B 7/06; H04B 7/0617; H04B 7/0408; H04B 7/0413; H04B 7/0426; H04B 7/043; H04B 7/0802; H04B 7/0897; H04B 2215/063; H04B 7/0452; H04B 7/0491; H04B 7/0495; H04B 7/0613; H04B 7/0602; H04B 7/0608; H04B 7/0684; H04B 7/013; H04B 7/00; H04B 7/0628; H04B 10/614; H04B 7/10; H04B 7/0469; H04B 7/2625; H04B 7/2631; H04B 7/086; H04B 7/005; H04B 7/066; H04B 7/0695; H04W 16/00; H04W 16/28; H04W 40/06;
(Continued)

(56) References Cited

U.S. PATENT DOCUMENTS

2003/0162566 A1*  8/2003  Shapira et al. ............... 455/561
2004/0198292 A1* 10/2004  Smith et al. ................. 455/272
(Continued)

FOREIGN PATENT DOCUMENTS

WO     2004004156 A1     1/2004

*Primary Examiner* — Meless N Zewdu
(74) *Attorney, Agent, or Firm* — Coats & Bennett, PLLC

(57) ABSTRACT

The present disclosure relates to a wireless communication system node (1), where the node (1) comprises at least two antenna ports (P1A, P1B, P1C, P1D; P2A, P2B, P2C, P2D). The node (1) further comprises a beamforming controller (2) and a 5 beamforming network (3) which in turn comprises at least two beam ports (4, 5, 6, 7; 8, 9, 10, 11) that are adapted to provide corresponding beams (12, 13, 14, 15; 16, 17, 18, 19). The beamforming controller (2) is arranged to control the beamforming network (3) such that the beams (12, 13, 14, 15; 16, 17, 18, 19) have a common envelope (20) in a desired plane, where the common envelope (20) is adapted to a 10 desired coverage for a certain communication system sector (37).

10 Claims, 4 Drawing Sheets

(58) Field of Classification Search
CPC ............. H04W 72/046; H04W 72/042; H04W 72/044; H04W 72/1289; H04W 40/00; H04W 88/00; H04W 88/02; H04W 88/08; H04W 52/244; H04W 64/00; H04W 52/42; H04L 27/26035; H01Q 3/22; H01Q 3/24; H01Q 3/26; H01Q 3/2623; H01Q 5/28; H01Q 15/147; H01Q 25/002; H01Q 25/00; H01Q 3/00; G01S 7/5209; G01S 1/52; G01S 3/60; G01S 7/52092; G01S 13/48; G01S 7/52095
See application file for complete search history.

(56) References Cited

U.S. PATENT DOCUMENTS

| | | | |
|---|---|---|---|
| 2005/0117675 A1* | 6/2005 | Das et al. .................... 375/343 |
| 2006/0194548 A1* | 8/2006 | Nagaraj ........................ 455/73 |
| 2007/0099578 A1* | 5/2007 | Adeney et al. ................ 455/69 |
| 2007/0205955 A1* | 9/2007 | Korisch et al. ............... 343/853 |
| 2009/0058725 A1* | 3/2009 | Barker et al. ................. 342/372 |
| 2014/0050280 A1* | 2/2014 | Stirling-Gallacher et al. .............. H04B 7/0486 |
| 2014/0139395 A1* | 5/2014 | Solondz ........................ 343/872 |
| 2015/0333885 A1* | 11/2015 | Athley ................. H04L 5/0048 |

* cited by examiner

WIRELESS COMMUNICATION SYSTEM NODE WITH FIXED BEAMS HAVING COMMON ENVELOPE

TECHNICAL FIELD

The present disclosure relates to a wireless communication system node that comprises at least two antenna ports. The node further comprises a beamforming controller and a beamforming network which in turn comprises at least two beam ports that are adapted to provide corresponding beams.

BACKGROUND

Nodes that makes use of fixed beamforming is of interest for wireless communication networks, such as Radio Access Networks. Fixed beamforming implies that the spatial coverage area is covered by a fixed number of beams that are static during a certain time, such as during a certain operation. One example for utilizing a fixed beam system is if the base band resources are limited, and a dynamic beam system is not possible. Another example is in a random access scenario where a limited number of beams with relatively high gain, at least higher than one element, is needed to find the UE.

It is therefore a desire to provide a node for a wireless communication system, where the node is arranged for fixed beamforming in a more efficient manner than previously.

SUMMARY

It is an object of the present disclosure to provide a node in a wireless communication system, where the node has an antenna arrangement that enables changing of the sector shape, for example the sector width, in wireless cellular networks where all beams are matched to the new sector width.

Said object is obtained by means of a wireless communication system node that comprises at least two antenna ports. The node further comprises a beamforming controller and a beamforming network which in turn comprises at least two beam ports that are adapted to provide corresponding beams. The beamforming controller is arranged to control the beamforming network such that the beams have a common envelope in a desired plane, where the common envelope is adapted to a desired coverage for a certain communication system sector.

Said object is also obtained by means of a method for adapting beam coverage to a desired coverage for a certain communication system sector. The method comprises generating at least two controllable beams and controlling the beams to have a common envelope in a desired plane, where the common envelope is adapted to the desired coverage.

This provides an advantage by enabling distribution of beams in an efficient manner such that the gain is balanced in different directions, and can be adapted to the cell shape.

According to some aspects, the common envelope is adapted to follow a predefined reference curve in an optimal manner.

This provides an advantage by providing a clearly defined aim for the common envelope.

According to some aspects, the beamforming controller is arranged to control the beamforming network to form a plurality of sets of beams such that a plurality of common envelopes is obtained. For each common envelope, the beamforming controller is arranged to determine an angular value where a difference between an amplitude of the common envelope and an amplitude of the reference curve has a lowest value, and where the beamforming controller is arranged to control the beamforming network such that said lowest value is maximized for the next envelope.

This provides an advantage by providing means for practically obtaining the common envelope.

According to some aspects, the node comprises at least two antenna ports that are adapted to be connected to a first polarization, and at least two antenna ports adapted to be connected to a second polarization that is mutually orthogonal to the first polarization.

According to some aspects, the beam ports are adapted to provide corresponding beams of a first beam polarization and corresponding beams of a second beam polarization, orthogonal to the first beam polarization.

According to some aspects, beams of different beam polarizations are at least partly overlaying each other pair-wise, constituting beam pairs with mutually orthogonal polarizations.

This provides an advantage by enabling dual polarized beamforming.

According to some aspects, each beam pair is adapted to cover a corresponding sub-sector comprised in the communication system sector, where at least two sub-sectors have different corresponding angular sizes.

This provides an advantage by enabling dual polarized beamforming that is adapted to the cell shape.

According to some aspects, the node comprises at least one antenna arrangement, where each antenna arrangement in turn comprises at least two antenna devices positioned in a row. Each antenna device comprises a corresponding pair of antenna ports with a corresponding first antenna port and second antenna port. Each antenna device comprises at least one corresponding dual polarized antenna element arranged for transmitting and receiving signals at the first polarization via the corresponding first antenna port and for transmitting and receiving signals at the second polarization via the corresponding second antenna port.

BRIEF DESCRIPTION OF THE DRAWINGS

The present disclosure will now be described more in detail with reference to the appended drawings, where.

DETAILED DESCRIPTION

Figure 1:
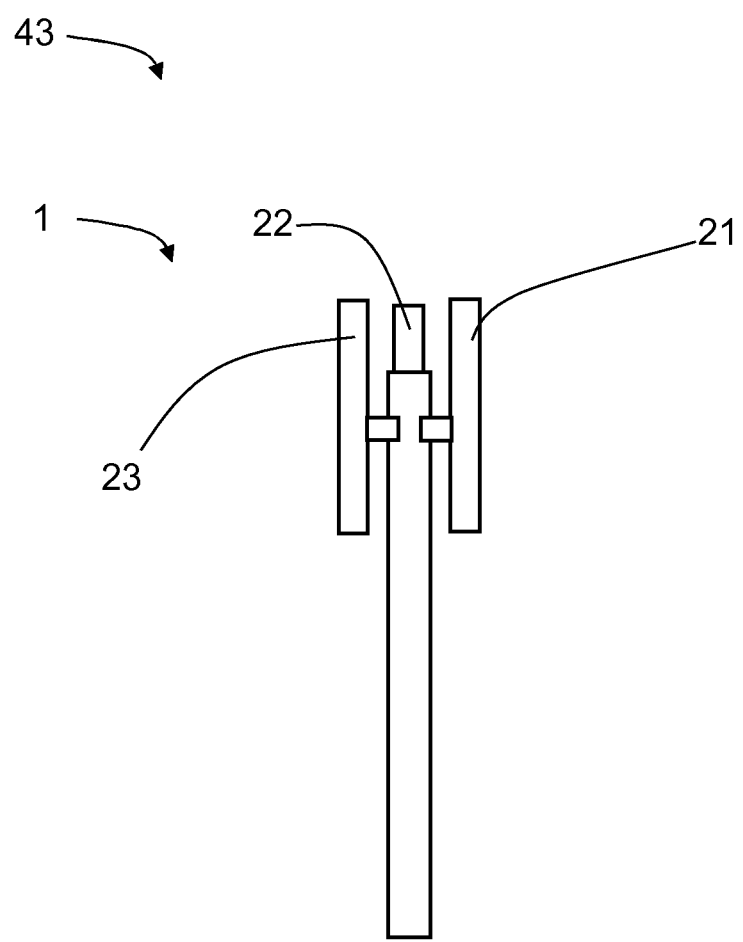
FIG. 1 shows a schematical view of a wireless communication system node.
Figure 2:
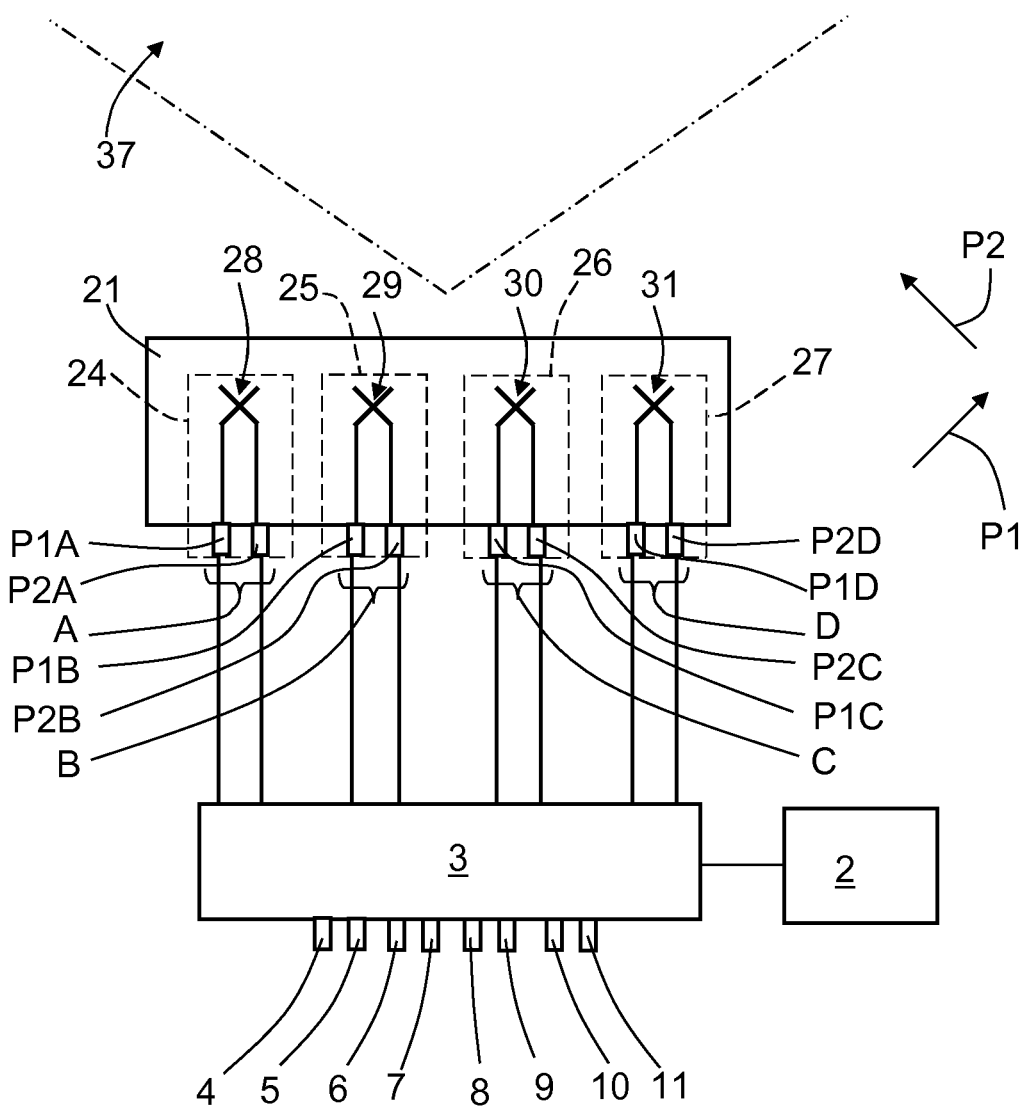
FIG. 2 shows a schematical view of an antenna arrangement according to an example of the present disclosure.

With reference to FIG. 1, there is a node 1 in a wireless system 43, where the node 1 comprises three antenna arrangements 21, 22, 23. In the following a first antenna arrangement 21 will be described, but the features of the first antenna arrangement 21 is according to some aspects present also for the other antenna arrangements 22, 23. The first antenna arrangement 21 comprises four antenna devices 24, 25, 26, 27 positioned in a row. Each antenna device 24, 25, 26, 27 comprises a corresponding pair of antenna ports A, B, C, D with a corresponding first polarization antenna port P1A, P1B, P1C, P1D and second polarization antenna port P2A, P2B, P2C, P2D.

Each antenna device 24, 25, 26, 27 comprises a corresponding dual polarized antenna element 28, 29, 30, 31 arranged for transmitting and receiving signals at a first polarization P1 via the corresponding first polarization antenna port P1A, P1B, P1C, P1D and for transmitting and receiving signals at a second polarization P2 that is mutually orthogonal to the first polarization P1, via the corresponding second antenna port P2A, P2B, P2C, P2D.

More in detail, the node 1 comprises a first polarization first antenna port P1A, a first polarization second antenna port P1B, a first polarization third antenna port P1C and a first polarization fourth antenna port P1D, where these antenna ports P1A, P1B, P1C, P1D are adapted to be connected to the first polarization P1. The node further comprises a second polarization first antenna port P2A, a second polarization second antenna port P2B, a second polarization third antenna port P2C and a second polarization fourth antenna port P2D, where these antenna ports P2A, P2B, P2C, P2D are adapted to be connected to the second polarization P2.

The node 1 further comprises a beamforming controller 2 and a beamforming network 3 which in turn comprises a first beam port 4, second beam port 5, a third beam port 6 and a fourth beam port 7, where these beam ports 4, 5, 6, 7 are adapted to provide corresponding beams 12, 13, 14, 15 of a first beam polarization B1. The beamforming network 3 furthermore comprises a fifth beam port P2A, a sixth beam port P2B, a seventh beam port P2C and an eighth P2D beam port, where these beam ports are adapted to provide corresponding beams 16, 17, 18, 19 of a second beam polarization B2, orthogonal to the first beam polarization B1.

Beams 12, 13, 14, 15; 16, 17, 18, 19 of different beam polarizations B1, B2 are overlaying each other pair-wise, constituting beam pairs 12, 16; 13, 17; 14, 18; 15; 19 with mutually orthogonal polarizations. The beams 12, 13, 14, 15; 16, 17, 18, 19 have a common envelope 20 in an azimuth plane.

According to the present disclosure, the beamforming controller 2 is arranged to control the beamforming network 3 such that the common envelope 20 is adapted to a desired coverage for a certain communication system sector 37 having a certain angular sector size $\varphi$ in azimuth. The common envelope 20 is in this example adapted to follow a predefined reference curve 32 in an optimal manner.

More in detail, there is a first beam pair 12, 16 adapted to cover a first sub-sector 33, a second beam pair 13, 17 adapted to cover a second sub-sector 34, a third beam pair 14, 18 adapted to cover a third sub-sector 35 and a fourth beam pair 15, 19 adapted to cover a fourth sub-sector 36. The first sub-sector 33 has a first angular size $\varphi_1$ in azimuth, the second sub-sector 34 has a second angular size $\varphi_2$ in azimuth, the third sub-sector 35 has a third angular size $\varphi_3$ in azimuth, and the fourth sub-sector 36 has a fourth angular size $\varphi_4$ in azimuth. The first angular size $\varphi_1$ equals the fourth angular size $\varphi_4$, and the second angular size $\varphi_2$ equals the third angular size $\varphi_3$. The first angular size $\varphi_1$ exceeds the second angular size $\varphi_2$, and correspondingly the fourth angular size $\varphi_4$ exceeds the third angular size $\varphi_3$. Generally, at least two sub-sectors 33, 34; 35, 36 have different corresponding angular sizes $\varphi_1$, $\varphi_2$; $\varphi_3$, $\varphi_4$.

This means that, non-uniform fixed beams are obtained. This is advantageous, since uniform beams can result in several problems. For example, uniform beams are typically the smallest beam an antenna aperture can generate which implies that many beams are needed to cover a desired area. Also, the gain of fixed beams in the maximum direction can be too high compared to boresight direction, which can generate interference.

Figure 4:
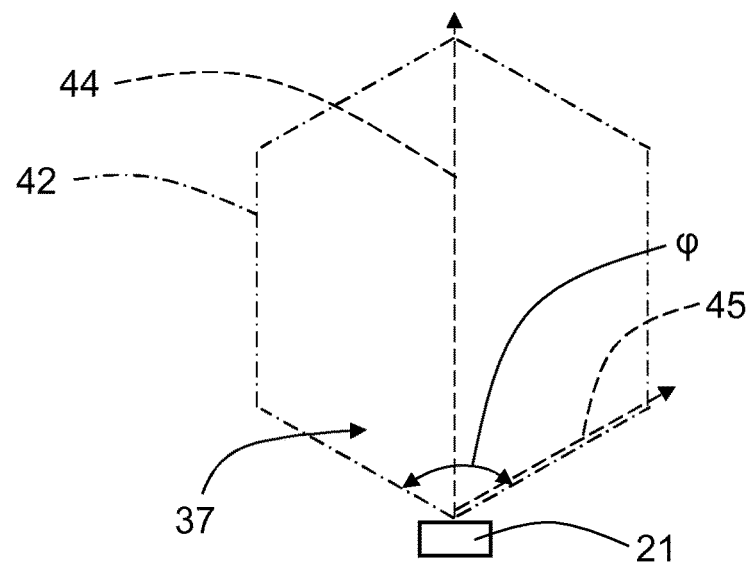
FIG. 4 shows a communication system cell.

With reference to FIG. 4, the communication system sector 37 is according to some aspects comprised in a hexagon-shaped communication system cell 42 having a certain cell shape. There is an evident range difference between boresight direction 44 and at a maximum azimuth direction 45, and a Gaussian beam with 65° beamwidth is a possible solution.

The present disclosure discloses using an optimized number of non-uniform beams to cover a specific area while optimizing interference. The beams are distributed such that the gain is balanced in different directions in accordance with the cell shape.

Figure 3:
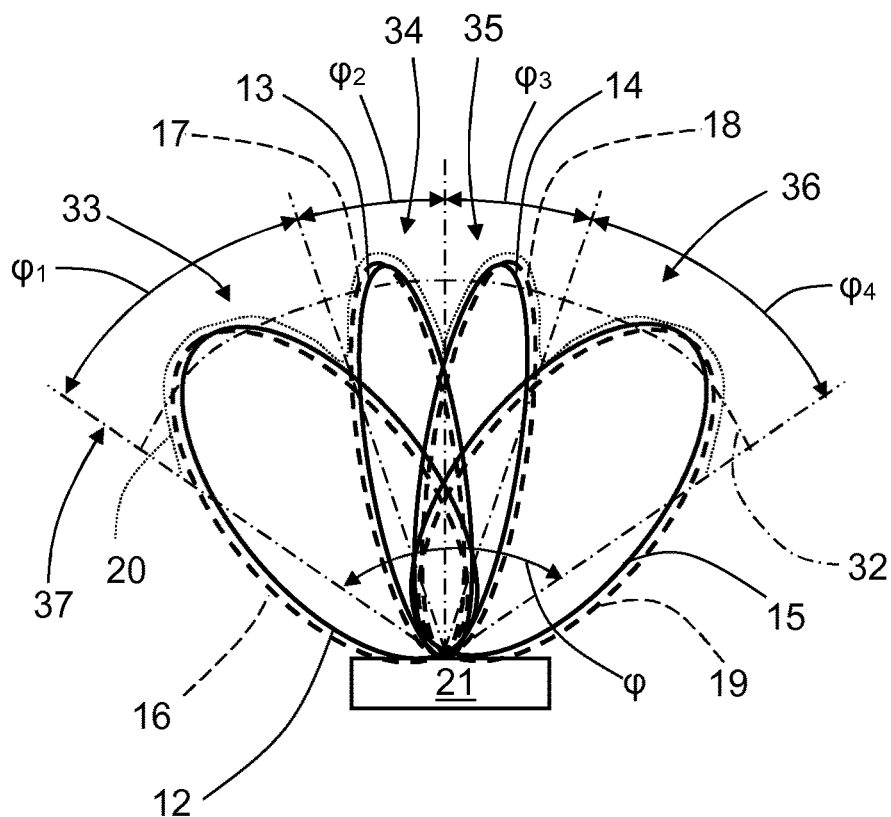
FIG. 3 shows a schematical view of beams according to an example of the present disclosure.
Figure 5:
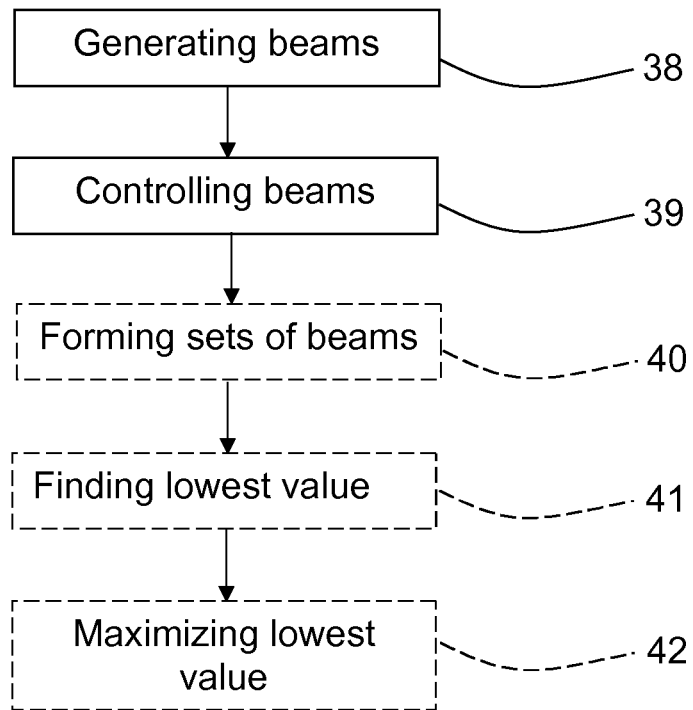
FIG. 5 shows a flowchart of a method according to the present disclosure.

With reference to FIG. 3 and FIG. 5, the present disclosure relates to a method for adapting beam coverage to a desired coverage for a certain communication system sector 37. The method comprises:

38: Generating at least two controllable beams 12, 13, 14, 15.

39: Controlling the beams 12, 13, 14, 15 to have a common envelope 20 in a desired plane, where the common envelope 20 is adapted to said desired coverage.

According to some aspects, the common envelope 20 is adapted to follow a predefined reference curve 32 in an optimal manner.

In that case, according to some further aspects, the method comprises:

40: Forming a plurality of sets of beams 12, 13, 14, 15 such that a plurality of common envelopes is obtained.

For each common envelope 20, the method further comprises:

41: Determining an angular value where a difference between an amplitude of the common envelope 20 and an amplitude of the reference curve 32 has a lowest value.

42: Maximizing said lowest value for the next envelope.

Figure 6:
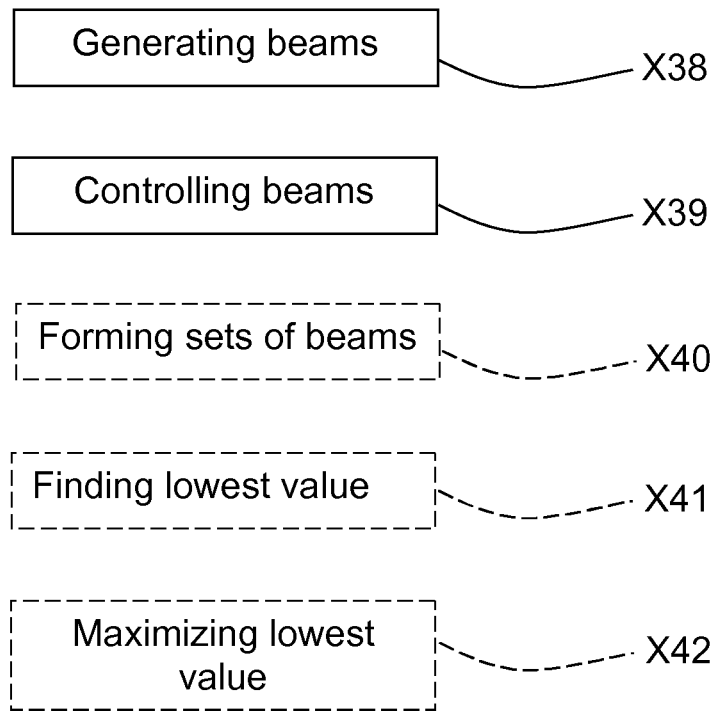
FIG. 6 shows a wireless communication system node according to some aspects of the present disclosure.

With reference to FIG. 1, FIG. 3 and FIG. 6, there is a wireless communication system node 1 that comprises:

A generating module X38 that is that is configured to generate at least two controllable beams 12, 13, 14, 15.

A controlling module X39 that is that is configured to control the beams 12, 13, 14, 15 to have a common envelope 20 in a desired plane, where the common envelope 20 is adapted to said desired coverage.

According to some aspects, the common envelope 20 is adapted to follow a predefined reference curve 32 in an optimal manner.

In that case, according to some further aspects, the wireless communication system node 1 comprises a forming module X40 that is configured to form a plurality of sets of beams 12, 13, 14, 15 such that a plurality of common envelopes is obtained. For each common envelope 20, the wireless communication system node 1 comprises: A determining module X41 that is configured to determine an angular value where a difference between an amplitude of the common envelope 20 and an amplitude of the reference curve 32 has a lowest value.

A maximizing module X42 that is configured to maximize said lowest value for the next envelope.

The present disclosure is not limited to the examples above, but may vary freely within the scope of the appended claims. For example, the node 1 may comprise one or more antenna arrangements, each antenna arrangement being arranged to cover a certain communication system sector 37. The communication system sector or sectors do not have to lie in an azimuth plane, by may lie in any suitable plane, such as for example an elevation plane, and is generally referred to as a desired plane. The communication system sector 37, comprises at least two sub-sectors.

The antenna devices 24, 25, 26, 27 are positioned in a row one after the other, where the row may lie in any suitable plane such as a horizontal plane or a vertical plane.

According to some aspects, each antenna device 24, 25, 26, 27 comprises on or more antenna elements which are placed such that they form a one-dimensional array antenna or a two-dimensional array antenna. According to some further aspects, each antenna element is in turn constituted by several sub-elements or even sub-arrays.

Beams of different beam polarizations are according to some aspects at least partly overlaying each other pair-wise.

The antenna devices have been described as dual polarized, and there have been described beams that are dual polarized. According to some aspects, the antenna devices are single polarized, and the beams then only have only one polarization. Then no pair-wise overlaying beam pairs are formed, but then single beams are all angularly spread out similar to the way the beam pairs are spread out. Then there is only one beam for each sub-sector.

Generally, the node 1 comprises at least two antenna ports P1A, P1B, P1C, P1D; P2A, P2B, P2C, P2D and at least two beam ports 4, 5, 6, 7; 8, 9, 10; 11, enabling at least two beams 12, 13, 14, 15. The communication system sector 37 thus comprises at least two sub-sectors 33, 34, 35, 36.

When there is a first beam polarization B1 and a second beam polarization B2, these beam polarizations B1, B2 can change for different angles in the desired plane, but are maintained mutually orthogonal.

The beamforming network 3 is according to aspects digital; alternatively analogue where, for example, the beams are time multiplexed.

The term beam refers to a beamformed antenna beam.

As mentioned initially, fixed beamforming, that is used for obtaining fixed beams, implies that a spatial coverage area is covered by a fixed number of beams that are static during a certain time, such as during a certain operation.

Term such as for example equal and orthogonal do in this context not mean to interpreted as mathematically exact, but within what is practically obtainable in this field of technology.

Generally, the present disclosure relates to a wireless communication system node 1, where the node 1 comprises at least two antenna ports P1A, P1B, P1C, P1D; P2A, P2B, P2C, P2D, where the node 1 further comprises a beamforming controller 2 and a beamforming network 3 which in turn comprises at least two beam ports 4, 5, 6, 7; 8, 9, 10, 11 that are adapted to provide corresponding beams 12, 13, 14, 15; 16, 17, 18, 19. he beamforming controller 2 is arranged to control the beamforming network 3 such that the beams 12, 13, 14, 15; 16, 17, 18, 19 have a common envelope 20 in a desired plane, where the common envelope 20 is adapted to a desired coverage for a certain communication system sector 37.

According to some aspects, the common envelope 20 is adapted to follow a predefined reference curve 32 in an optimal manner.

According to some aspects, the beamforming controller 2 is arranged to control the beamforming network 3 to form a plurality of sets of beams 12, 13, 14, 15; 16, 17, 18, 19 such that a plurality of common envelopes is obtained, where, for each common envelope 20, the beamforming controller 2 is arranged to determine an angular value where a difference between an amplitude of the common envelope 20 and an amplitude of the reference curve 32 has a lowest value, and where the beamforming controller 2 is arranged to control the beamforming network 3 such that said lowest value is maximized for the next envelope.

According to some aspects, the node 1 comprises at least two antenna ports P1A, P1B, P1C, P1D that are adapted to be connected to a first polarization P1, and at least two antenna ports P2A, P2B, P2C, P2D adapted to be connected to a second polarization P2 that is mutually orthogonal to the first polarization P1

According to some aspects, said beam ports 4, 5, 6, 7; 8, 9, 10; 11 are adapted to provide corresponding beams 12, 13, 14, 15 of a first beam polarization B1 and corresponding beams 16, 17, 18, 19 of a second beam polarization B2, orthogonal to the first beam polarization B1.

According to some aspects, beams 12, 13, 14, 15; 16, 17, 18, 19 of different beam polarizations B1, B2 are at least partly overlaying each other pair-wise, constituting beam pairs 12, 16; 13, 17; 14, 18; 15; 19 with mutually orthogonal polarizations.

According to some aspects, each beam pair 12, 16; 13, 17; 14, 18; 15, 19 is adapted to cover a corresponding sub-sector 33, 34, 35, 36 comprised in the communication system sector 37, where at least two sub-sectors 33, 34; 35, 36 have different corresponding angular sizes $\varphi_1$, $\varphi_2$; $\varphi_3$, $\varphi_4$.

According to some aspects, the node 1 comprises at least one antenna arrangement 21, 22, 23, where each antenna arrangement 21, 22, 23 in turn comprises at least two antenna devices 24, 25, 26, 27 positioned in a row, each antenna device 24, 25, 26, 27 comprising a corresponding pair of antenna ports A, B, C, D with a corresponding first antenna port P1A, P1B, P1C, P1D and second antenna port P2A, P2B, P2C, P2D, where each antenna device 24, 25, 26, 27 comprises at least one corresponding dual polarized antenna element 28, 29, 30, 31 arranged for transmitting and receiving signals at the first polarization P1 via the corresponding first antenna port P1A, P1B, P1C, P1D and for transmitting and receiving signals at the second polarization P2 via the corresponding second antenna port P2A, P2B, P2C, P2D.

The present disclosure also relates to a method for adapting beam coverage to a desired coverage for a certain communication system sector 37, where the method comprises:

38: generating at least two controllable beams 12, 13, 14, 15; 16, 17, 18, 19;

39: controlling the beams 12, 13, 14, 15; 16, 17, 18, 19 to have a common envelope 20 in a desired plane, where the common envelope 20 is adapted to said desired coverage.

According to some aspects, the common envelope 20 is adapted to follow a predefined reference curve 32 in an optimal manner.

According to some aspects, the method comprises:

40: forming a plurality of sets of beams 12, 13, 14, 15; 16, 17, 18, 19 such that a plurality of common envelopes is obtained, where, for each common envelope 20, the method further comprises:

41: determining an angular value where a difference between an amplitude of the common envelope 20 and an amplitude of the reference curve 32 has a lowest value, and 42: maximizing said lowest value for the next envelope.

According to some aspects, the method comprises generating controllable beams 12, 13, 14, 15 having a first beam polarization B1, and generating beams 16, 17, 18, 19 having a second beam polarization B2, orthogonal to the first beam polarization B1.

According to some aspects, beams 12, 13, 14, 15; 16, 17, 18, 19 of different beam polarization B1, B2 are at least partly overlaying each other pair-wise, constituting beam pairs 12, 16; 13, 17; 14, 18; 15; 19 with mutually orthogonal polarizations.

According to some aspects, each beam pair 12, 16; 13, 17; 14, 18; 15; 19 is used for covering a corresponding sub-sector 33, 34, 35, 36 comprised in the communication system sector 37, where at least two sub-sectors 33, 34; 35, 36 have different corresponding angular sizes $\varphi_1$, $\varphi_2$; $\varphi_3$, $\varphi_4$.

The invention claimed is:

1. A wireless communication system node, comprising:
at least two antenna ports;
a beamforming network operatively connected to the at least two antenna ports and comprising at least two beam ports that are configured to provide corresponding beams; and
a beamforming controller configured to control the beamforming network such that the beams have a common envelope in a desired plane, where the common envelope is adapted to provide coverage for a communication system sector;
wherein the common envelope is configured to follow a predefined reference curve in an optimal manner;
wherein the beamforming controller is configured to:
control the beamforming network to form a plurality of sets of beams such that a plurality of common envelopes are obtained;
determine, for each of the common envelopes of the plurality of common envelopes, an angular value where a difference between an amplitude of the common envelope and an amplitude of the reference curve has a lowest value; and
control the beamforming network such that the lowest value is maximized for a next envelope of the plurality of common envelopes.

2. The node of claim 1, wherein:
at least two of the antenna ports are configured to be connected to a first polarization; and
at least two of the antenna ports are configured to be connected to a second polarization that is mutually orthogonal to the first polarization.

3. The node of claim 2, wherein the at least two beam ports are configured to provide:
corresponding beams of a first beam polarization; and
corresponding beams of a second beam polarization, orthogonal to the first beam polarization.

4. A wireless communication system node, comprising:
at least two antenna ports;
a beamforming network operatively connected to the at least two antenna ports and comprising at least two beam ports that are configured to provide corresponding beams; and
a beamforming controller configured to control the beamforming network such that the beams have a common envelope in a desired plane, where the common envelope is adapted to provide coverage for a communication system sector;
wherein:
at least two of the antenna ports are configured to be connected to a first polarization; and
at least two of the antenna ports are configured to be connected to a second polarization that is mutually orthogonal to the first polarization;
wherein the at least two beam ports are configured to provide:
the corresponding beams of a first beam polarization; and
the corresponding beams of a second beam polarization, orthogonal to the first beam polarization; and
wherein beams of the first and second beam polarizations are at least partly overlaying each other pair-wise, constituting beam pairs with mutually orthogonal polarizations.

5. The node of claim 4, wherein:
each is of the beam pairs are configured to cover a corresponding sub-sector in the communication system sector; and
at least two of the sub-sectors have different corresponding angular sizes.

6. The node of claim 4:
wherein the node comprises at least one antenna arrangement;
wherein each antenna arrangement comprises at least two antenna devices positioned in a row;
wherein each of the at least two antenna devices comprises:
a corresponding pair of antenna ports with a corresponding first antenna port and second antenna port; and
at least one corresponding dual polarized antenna element configured for transmitting and receiving signals at the first polarization via the corresponding first antenna port and for transmitting and receiving signals at the second polarization via the corresponding second antenna port.

7. A method for adapting beam coverage for communication system sector, the method comprising:
generating at least two controllable beams;
controlling the at least two controllable beams to have a common envelope in a desired plane, where the common envelope is configured to provide coverage to the communication system sector; wherein the common envelope is configured to follow a predefined reference curve in an optimal manner;
forming a plurality of sets of beams such that a plurality of common envelopes are obtained; and
for each of the plurality of common envelopes:
determining an angular value where a difference between an amplitude of that common envelope of the plurality of common envelopes and an amplitude of the reference curve has a lowest value; and
maximizing the lowest value for a next envelope of the plurality of common envelopes.

8. The method of claim 7, wherein the generating the at least two controllable beams comprises:
generating beams of the at least two controllable beams having a first beam polarization; and
generating beams of the at least two controllable beams having a second beam polarization, orthogonal to the first beam polarization.

9. A method for adapting beam coverage for a communication system sector, the method comprising:
generating at least two controllable beams;
controlling the at least two controllable beams to have a common envelope in a desired plane, where the common envelope is configured to provide coverage for the communication system sector;
wherein the generating the at least two controllable beams comprises:
generating beams of the at least two controllable beams having a first beam polarization; and generating beams of the at least two controllable beams having a second beam polarization, orthogonal to the first beam polarization;

wherein beams of the first and second beam polarizations are at least partly overlaying each other pair-wise, constituting beam pairs with mutually orthogonal polarizations.

10. The method of claim 9, wherein:

each of the beam pairs is used for covering a corresponding sub-sector in the communication system sector; and at least two of the sub-sectors have different corresponding angular sizes.

* * * * *